March 3, 1970　　　　W. D. STRINGFELLOW　　　　3,498,187
HYDRAULICALLY OPERATED RACK AND PINION ACTUATOR
Filed May 13, 1968　　　　　　　　　　　　　　3 Sheets-Sheet 3

INVENTOR:
William D. Stringfellow

ATTORNEYS

United States Patent Office 3,498,187
Patented Mar. 3, 1970

3,498,187
HYDRAULICALLY OPERATED RACK AND PINION ACTUATOR
William D. Stringfellow, Downey, Calif., assignor to Sargent Industries Inc., Los Angeles, Calif., a corporation of Delaware
Filed May 13, 1968, Ser. No. 728,523
Int. Cl. F15b *15/26;* F01b *9/00;* F16h *1/04*
U.S. Cl. 92—24                                           10 Claims

ABSTRACT OF THE DISCLOSURE

An actuator which is particularly adapted for moving the flaps of an airplane between the extended and retracted positions thereof. The actuator includes a housing defining a chamber, a piston movable in the chamber and affixed to a rack, an output shaft, and means for drivingly connecting the rack to the output shaft. In use of the actuator, forces are applied to the rack and these forces are absorbed by a special bearing surface on the housing rather than by the wall surface defining the chamber for the piston. A differentially splined shaft drivingly connects the output shaft of the actuator to the input shaft for the flaps.

BACKGROUND OF THE INVENTION

Actuators are used to drive the flaps of an airplane between the extended and retracted positions thereof. A typical prior art actuator of this type includes an air motor driving a planetary hinge through a torque tube. These actuators are complex, thus tending to be heavy, costly, difficult to maintain, and unreliable. Accordingly, it is desirable to use a fluid actuator to actuate the flaps of an airplane; however, fluid actuators now in use are generally not suited for this type of service.

A fluid actuator typically includes a piston movable along a linear path. This linear piston motion must be converted to rotary motion and transmitted to the flaps and one way to accomplish this is to connect a rack to the piston for movement therewith. The rack in turn drives a pinion which is drivingly connected to the flaps.

The problem with this construction is that the engagement of the teeth of the rack and pinion under load tends to force the rack away from the pinion, i.e. in a direction generally transverse to the direction of movement of the rack. In flight, G-loads often have a similar effect on the rack.

These forces tending to separate the rack and pinion must be counteracted if driving engagement between the rack and the pinion is to be maintained. According to one approach, the piston of the actuator is required to absorb these lateral loads; however, this causes scoring of the piston and cylinder walls. Another approach would be to allow the rack to bear against the cylinder wall as it moves with the piston. This, however, tends to score the cylinder wall. As the cylinder wall is a sealing surface, such scoring causes leakage by the piston and ultimate failure of the actuator.

Another difficult problem relates to mounting of the actuator on the aircraft. Typically, the airplane has a splined input shaft drivingly connected to the flaps for driving the flaps between the extended and retracted positions. Stops are provided on the airplane for mechanically holding the flaps in the extended and retracted positions thereof.

The actuator includes a housing for encasing the piston and the output shaft which is splined. The housing must be mounted on the aircraft in a predetermined position relative to the aircraft in accordance with the bolt holes provided on the housing and the aircraft for mounting purposes. It is necessary to drivingly interconnect the output shaft of the actuator to the input shaft on the aircraft and such driving connection must be made with the piston, the flaps, and the housing of the actuator all in preselected positions. Specifically, such connection is preferably made with the flaps in the retracted position and with the actuator locked in one of the extreme positions thereof.

As the allowable tolerance of the angular relationship of the splines on the input shaft is plus or minus 5°, there is considerable difficulty in drivingly joining the splines on the input and output shafts. The obvious solution to this problem is to provide slotted bolt holes to permit pivoting of the housing relative to the aircraft to the extent necessary to mach up the splines on the input and output shafts. However, the slotted bolt hole approach is not satisfactory because they cannot absorb the torque which is placed upon the housing during use thereof.

SUMMARY OF THE INVENTION

The present invention provides a fluid actuator which uses the airplane hydraulic system and eliminates the troublesome air motor of prior art units. This results in a lighter, simpler and more reliable actuator which is much easier to maintain. Although the actuator of this invention is particularly adapted for use with an aircraft, it can be used in many other environments.

The actuator may include a body or housing having a wall surface at least partially defining a chamber, a fluid pressure responsive piston slidable in the chamber and a rack connected to the piston for movement therewith. Movement of the piston is transmitted through the rack and suitable interconnecting means to an output shaft of the actuator.

According to the present invention, a bearing member is mounted adjacent the rack and engageable therewith to counteract the forces acting in a direction transverse to the direction of movement of the rack. The piston and the wall surface sealingly engage but the rack and bearing member do not, and need not, sealingly engage. Thus, the present invention provides for separating the bearing and sealing surfaces in an actuator to prevent scoring on the sealing surface as a result of the forces acting on the rack.

According to a preferred embodiment, the rack has a bearing surface which engages the bearing member and which is located radially inwardly of the wall surface defining the chamber. This permits the rack to be withdrawn into the cylinder during piston movement without engaging the wall surface of the chamber wall. This is desirable so that the dimensions and weight of the actuator can be held to a minimum.

According to a preferred construction, the actuator includes a pinion driven by the rack and mounted on the output shaft to drive the latter. Locking means are provided to mechanically lock the actuator in at least one position thereof. Preferably, all of the elements of the actuator are located within the housing to protect the elements from corrosion and to reduce the weight of the actuator by eliminating the need for separate supporting structures such as would be required for any element positioned outside of the housing.

The present invention also solves the problem of drivingly connecting the output shaft and the input shaft and does so by teaching the use of a differentially splined shaft for joining the output and input shafts. This concept is applicable to actuators generally and to flap actuators in particular. The differentially splined shaft has a greater number of splines on one end than the other end so that by turning of the differentially splined shaft relative to the input and output shafts, a position is ultimately reached at which the differentially splined shaft will mesh with both the input and output shafts. An added advantage is that all of the components of the actuator including the locking means can now be positioned within the housing as there is no need to make any adjustment thereof other than turning of the differentially splined shaft to the appropriate position.

The actuator can be locked in position by engaging a locking member with a locking lug formed integrally on the pinion. Additional weight is saved by the fact that the pinion has teeth over only a portion of the periphery thereof while the remainder of the periphery have the teeth eliminated therefrom.

Although exemplary embodiments of the invention have been shown and described, many changes, modifications and substitutions may be made by one having ordinary skill in the art without necessarily departing from the spirit and scope of this invention.

DESCRIPTION OF THE PREFERRED EMBODIMENT

Figure 1:
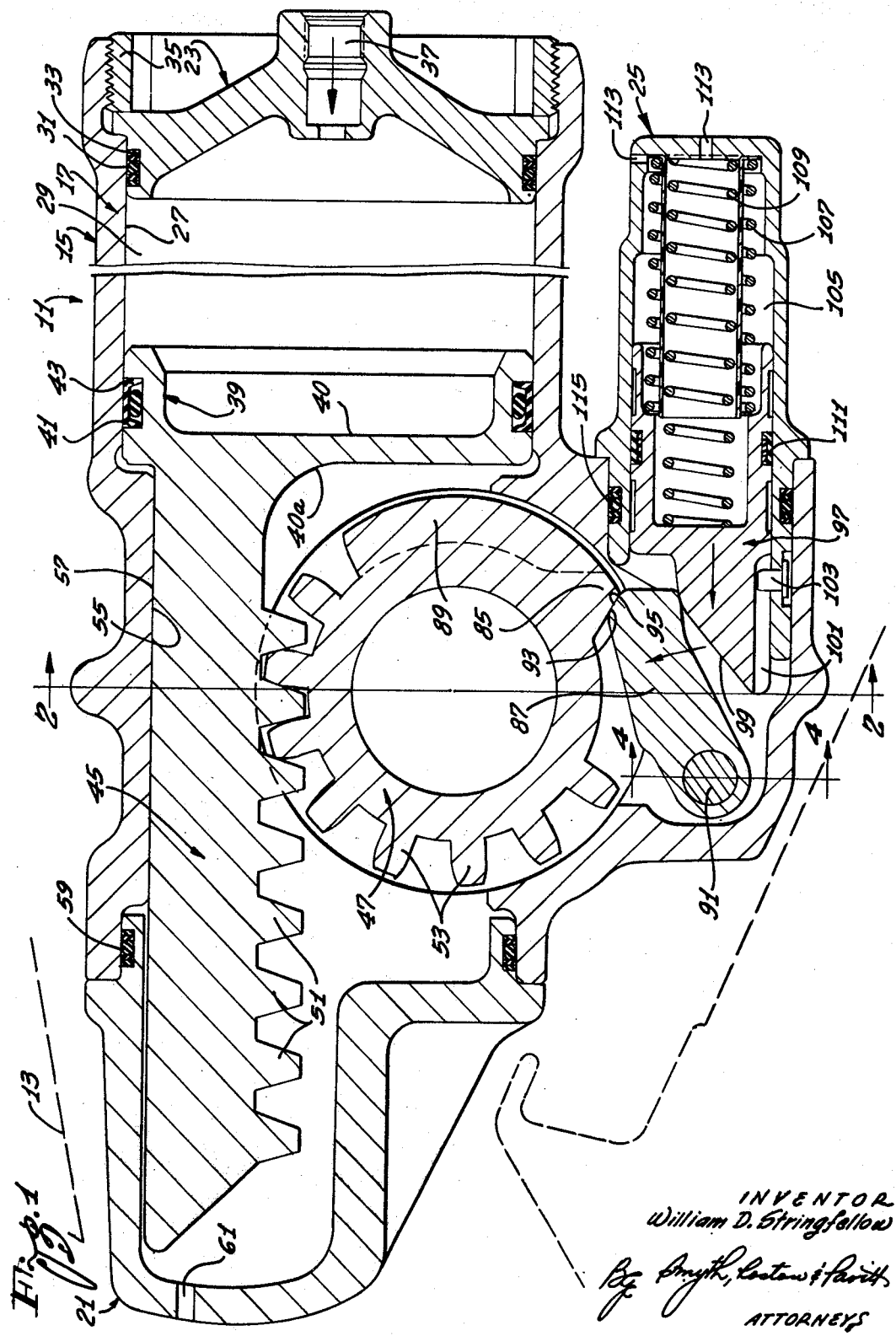
FIG. 1 is a sectional view through an actuator constructed in accordance with the teachings of this invention with the envelope within which the actuator is to be inserted shown in dashed lines.

Referring to the drawings and in particular to FIG. 1 thereof, reference numeral 11 designates an actuator constructed in accordance with the teachings of this invention. The actuator 11 is designed to fit within an envelope 13 such as may be found in an airplane.

The actuator 11 includes a housing 15 which is preferably provided in a plurality of sections. In the embodiment illustrated, the housing 15 includes a main section 17, an end cap 21, a closure member 23, and a section 25. The main section 17 has a smooth inner wall surface 27 that partially defines a cylinder or chamber 29. The right hand end of the cylinder 29 is closed by the closure member 23 and sealed by an O-ring 31 which is positioned in a groove 33 in the closure member. The closure member 23 is retained on the end of the cylinder section 17 by an annular screw 35. A central port 37 is formed in the closure member 23 and may be connected to a source of fluid under pressure (not shown) for the purpose of supplying fluid to and returning fluid from the cylinder 29 as permitted by a conventional external piping system. Preferably a hydraulic fluid is used with the actuator 11.

A piston 39 having faces 40 and 40a is mounted for sliding movement within the cylinder 29 between extended and retracted positions. The piston 39 has a circumferentially extending groove 41 with an annular sealing assembly 43 therein. The sealing assembly 43 forms a portion of the peripheral surface of the piston 39 and sealingly engages the wall surface 27 as the piston 39 moves through the cylinder 29.

Figure 2:
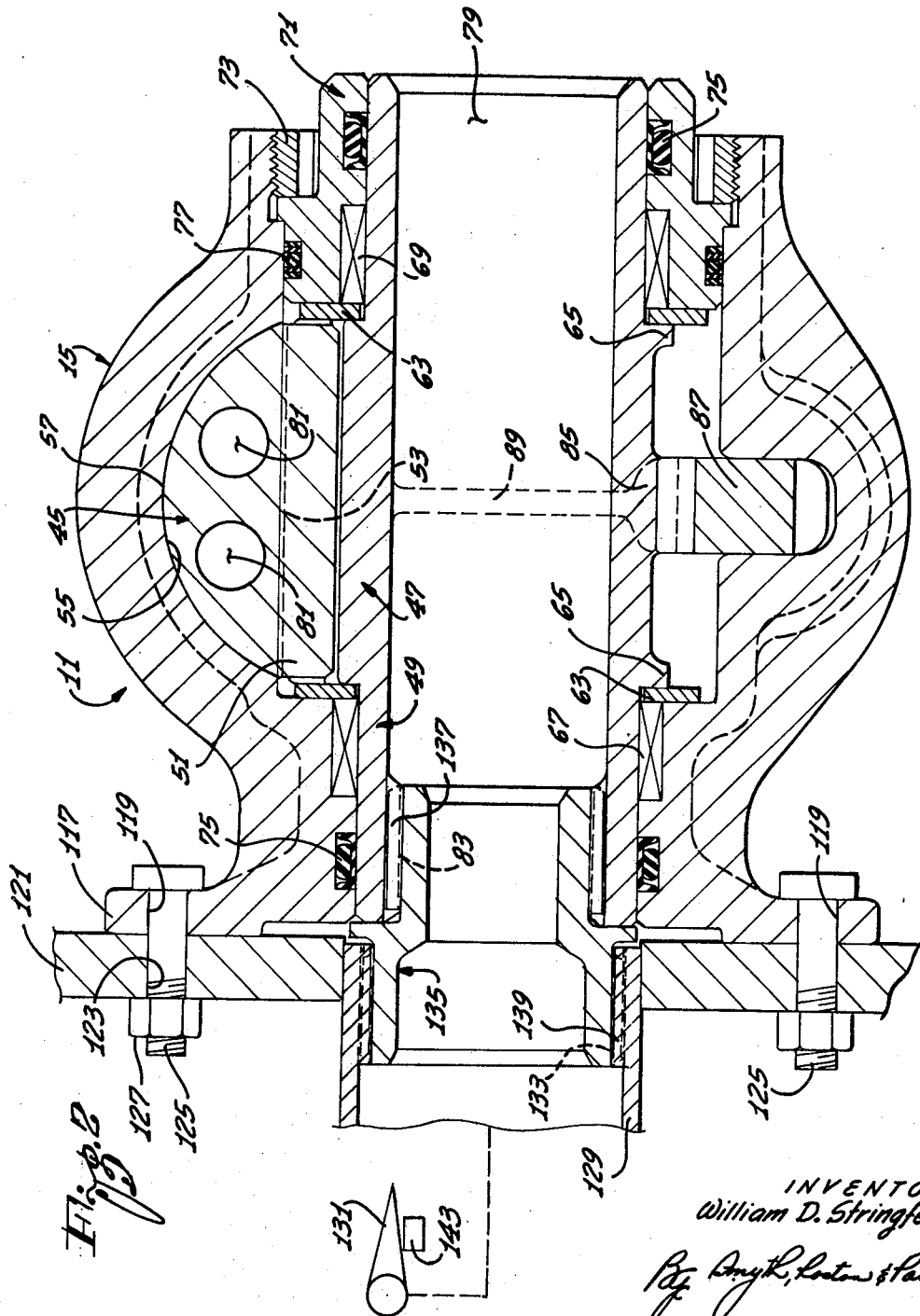
FIG. 2 is a sectional view taken along line 2—2 of FIG. 1.

A rack 45 is integral with the piston 39 and movable therewith. The rack 45 drives a pinion 47 which is integral with an output shaft 49 (FIG. 2). The rack 45 has a plurality of teeth 51 which mesh with teeth 53 formed on the periphery of the pinion 47. The engagement of the teeth 51 and 53 under load inherently exerts a force on the rack 45, a component of which tends to urge the rack upwardly as viewed in FIG. 1 in a direction transverse to the direction of movement of the rack 45. Accordingly, the section 17 of the housing provides a bearing surface 55 against which a bearing surface 57 of the rack can slide. To facilitate fabrication, the bearing surfaces 55 and 57 are preferably at least partially cylindrical as seen in FIG. 2.

It is important to not that the bearing surface 57 lies radially inwardly of the wall surface 27 so that when the piston 39 is in the retracted position, i.e. moved to the right, as viewed in FIG. 1, the rack 45 does not contact the wall surface 27 even though it is withdrawn within the cylinder 29. Rather, the bearing surface 57 of the rack 45 remains in contact with the bearing surface 55 which continues to support the latter against forces tending to move the rack 45 out of driving engagement with the pinion 47. To minimize the dimensions of the actuator, the piston 39 has a short axial dimension and is considerably shorter than the rack 45.

The cap 21 closes the lefthand end of the housing section 17 and is sealed thereto by an O-ring 59. The cap 21 is shaped so that the housing 15 will require a minimum amount of space. The end wall of the cap 21 has a port 61 therein which is connectible to an external hydraulic system for supplying hydraulic fluid to the housing and for returning fluid from the housing to the system. By supplying fluid to the cylinder 21 through the port 37 and by allowing fluid on the lefthand side of the piston 39 to return through the port 61, the piston and the rack 45 can be moved to the extreme lefthand position shown in FIG. 1. Conversely, by supplying fluid through the port 61 and returning fluid through the port 37, the piston 39 and the rack 45 can be moved to the right, as viewed in FIG. 1. Hydraulic controls for performing these fluid control functions are conventional and are not illustrated herein.

As shown in FIG. 2, the pinion 47 and the output shaft 49 are integral and are retained within the housing 15 by retaining rings 63 which engage shoulders 65 on the shaft 49. The housing 15 is open at both sides thereof to allow the output shaft 49 to extend therethrough. The output shaft 49 and the pinion 47 are mounted for rotation by suitable bearings 67 and 69. To facilitate assembly of the device, the bearings 69 are mounted in a removable sleeve 71 which is normally retained within the housing 15 by a threaded retainer 73. An annular sealing assembly 75 seals the end of the shaft 49 and a sealing assembly 77 seals the inner face between the sleeve 71 and the housing 15. To reduce the weight of the actuator 11, a bore 79 is formed through the pinion 47 and the output shaft 49 and two bores 81 are provided in the rack 45. The lefthand end of the output shaft 49 as viewed in FIG. 2 is formed with internal splines 83.

It is important that actuators used for flap movement be mechanically lockable with the flaps in the retracted position so that if the hydraulic system fails, the flaps are not free to move to the extended position. The present invention provides such a mechanical locking feature and in the embodiment illustrated takes the form of a locking lug 85 on the pinion 47 and a locking member 87. As shown in FIG. 1, the teeth 53 on the pinion 47 do not occupy the complete periphery of the pinion. Accordingly, there is sufficient room to provide the locking lug 85 in the form of a tooth-like segment on the periphery of the pinion 47. A narrow web of material 89 extends along a substantial portion of the periphery of the pinion 47 which is not occupied by the teeth 53. The presence of the thin web 89 in lieu of the relatively wide teeth (see FIG. 2) considerably reduces the weight of the pinion 47.

Figure 4:
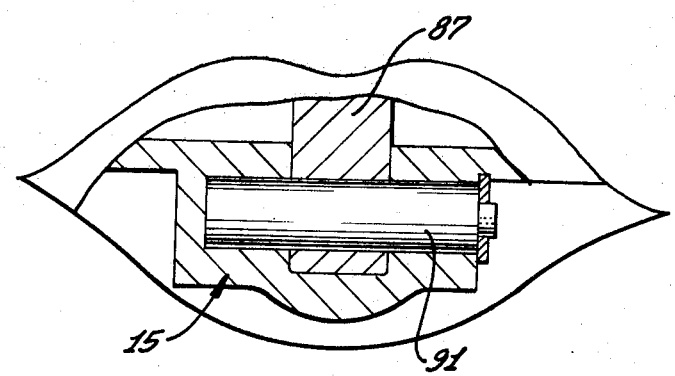
FIG. 4 is a fragmentary sectional view taken along line 4—4 of FIG. 1 and showing how the locking member is mounted.

The locking member 87 is pivotally mounted on the housing 15 by a pin 91 as shown in FIGS. 1 and 4. With the locking member 87 in the locking position, inclined surfaces 93 and 95 on the lug 85 and the locking member 87, respectively, engage to hold the pinion against rotation in the clockwise direction as shown in FIG. 1. The lug 85 and the closest tooth 53 are spaced sufficiently to provide adequate space for the locking member 87 as shown.

The locking member 87 is maintained in the locking position shown in FIG. 1 by a plunger 97 which is slidably mounted in the housing section 25. The plunger 97 has a forward inclined cam face 99 and a downward opening groove 101. A pin 103 is suitably fixed to the housing section 25 and rides in the groove 101 to prevent pivotal movement of the plunger 97 as it moves longitudinally within the housing section 25.

Figure 3:
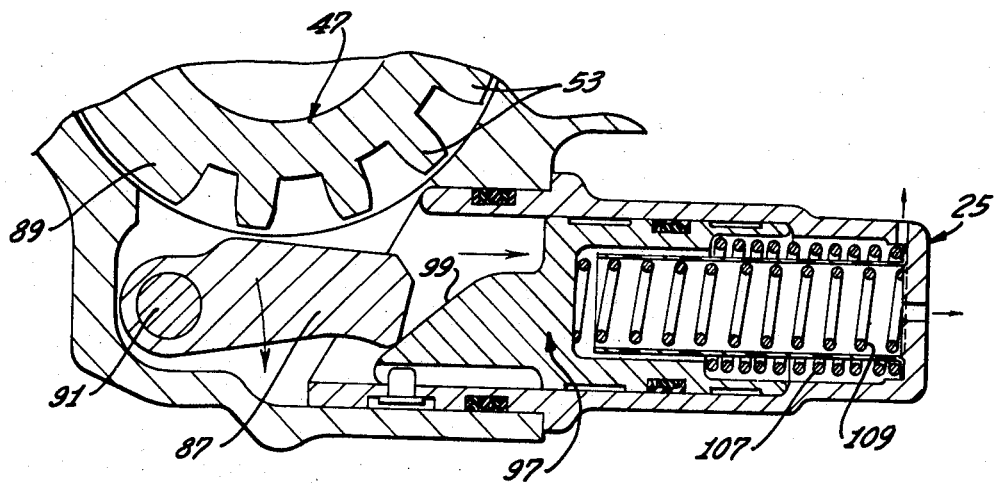
FIG. 3 is a fragmentary sectional view showing the locking means in the released position.

The housing section 25 forms a chamber 105 in which the plunger 97 can move. Two coil springs 107 and 109 urge the plunger 97 to the left as viewed in FIG. 1. A sealing assembly 111 surrounds the plunger 97 to prevent leakage of hydraulic fluid by the plunger into the chamber 105. Suitable vent openings 113 are formed in the housing section 25 on the righthand end of the plunger 97. The housing section 25 is sealed to the housing section 17 by a sealing assembly 115. When fluid under pressure is admitted through the port 61, it acts on the lefthand face of the plunger 97 to move the plunger to the right against the biasing action of the springs 107 and 109. The fluid also acts on the lefthand face of the piston 39 and moves the piston 39 to the right. Such movement of the piston 39 and rack 45 to the right tends to move the pinion 47 clockwise to permit the inclined surface 93 to cam the inclined surface 95 downwardly to the position shown in FIG. 3.

As shown in FIG. 2, the housing 15 has a flange 117 with a plurality of bolt holes 119 therein. Similarly, the aircraft has a wall 121 with bolt holes 123 therein. Bolts 125 project through the aligned holes 119 and 123 and are retained therein by nuts 127 to thereby rigidly secure the actuator 11 to the aircraft.

An input shaft 129 is suitably mounted within the airplane and is drivingly connected to the flaps 131 thereof so that by rotating the input shaft, the flaps 131 can be moved between the extended and retracted positions thereon. The input shaft 129 has internal splines 133.

The output shaft 49 and the input shaft 129 are drivingly interconnected by a hollow differentially splined shaft 135. One end portion of the shaft 135 has external splines 137 thereon and the other end portion of the shaft 135 has external splines 139. The shaft 135 is a differentially splined shaft and hence the number of splines 137 is different from the number of splines 139. In the embodiment illustrated, there are 33 splines 137 and 34 splines 139 and there are a corresponding number of splines 83 and 133 for engagement with the splines 137 and 139. The shaft 135 is retained in any suitable manner such as between the ends of shafts 129 and 49.

When it is desired to connect the actuator 11 to the wall 121, the actuator is moved to the position shown in FIG. 1 in which the lug 85 bears against the locking member 87 to prevent further clockwise rotation of the pinion 47. Similarly, the flaps 131 are positioned in a retracted position and are retained in a retracted position by a mechanical stop 143 within the airplane. With the shaft 135 drivingly engaging the input shaft 129, the actuator 11 is moved so as to align the bolt holes 119 and 123. In view of the 5 degree tolerance allowed for the splines of the input shaft 129, it is quite likely that the splines 83 and 137 will not mesh. Accordingly, the shaft 135 is simply slid out of driving engagement with the shaft 129 and turned slightly and then reinserted into the shaft 129. Suitable indicia may be provided on the wall 121 to give the workman an indication of the amount the shaft 135 must be turned to obtain proper alignment. This procedure is repeated until the splines 83 and 137 mesh at which time the bolts 125 are used to mount the actuator 11 on the wall 121. Adjustment using a differentially splined shaft is possible because in rotating the shaft 135, a number of degrees corresponding to one of the splines 139, the shaft is rotated an amount corresponding to slightly less than one of the splines 137. Thus, a position is eventually reached at which the splines 83 and 137 mesh.

With the elements of the actuator 11 positioned as shown in FIG. 1, high-presure fluid supplied to the port 37 acts on the righthand face 40 of the piston 39 thereby maintaining the piston in the position shown. Similarly, as there is only return pressure on the lefthand face 40a of the piston 39 and the plunger 97, the springs 107 and 109 are sufficiently strong to maintain the locking member 87 in engagement with the locking lug 85 to prevent clockwise movement of the pinion 47. Thus, even if pressure in the chamber 29 should be lost, the rack 45 cannot move to the right as shown in FIG. 1 because of the locking member 87.

When it is desired to extend the flaps, the port 37 is open to return and fluid at supply pressure is supplied through the port 61 to act on the lefthand face 40a of the plunger 97 and the piston 39. This urges the plunger 97 to the upright against the biasing force of the springs 107 and 108 to thereby free the locking member 87. Simultaneously, the rack 45 and piston 39 move to the right to cause the lug 85 to cam the locking member 87 downwardly out of the way to the position shown in FIG. 3. When the pressure at the port 61 is open to return, the springs 107 and 109 force the plunger 97 to the left to cause the cam face 99 thereof to cam the locking member 87 upwardly about the pin 91 into engagement with the web 89 and the piston 39 moves to the left. The locking member 87 rides along the web 89 and ultimately falls off of the web and into engagement with the locking lug 87 as shown in FIG. 1.

Although exemplary embodiments of the invention have been shown and described, many changes, modifications and substitutions may be made by one having ordinary skill in the art without necessarily departing from the spirit and scope of this invention.

I claim:
1. In an actuator, the combination:
   a housing having a first wall surface defining a chamber and a second wall surface defining a bearing surface, said bearing surface being adjacent one end of said chamber and disposed radially inwardly of the first wall surface;
   a fluid responsive piston in said chamber movable between an extended position and a retracted position under the influence of fluid supplied to the chamber, said piston having a peripheral surface slidable along said wall surface of said chamber as said piston moves between said positions thereof;
   a rack connected to one end of the piston and movable therewith along a predetermined path, said rack having a bearing surface lying inwardly of the peripheral surfaces of the piston and being slidable along said bearing surface of said housing as said piston moves between said positions thereof;
   a pinion rotatably mounted on said housing and drivable by the rack, said pinion being capable of exerting a force on said rack with at least a component of the force being in a direction generally transverse the direction of movement of the rack along said path;
   said bearing surface of said housing supporting said rack against said component of the force whereby forcible contact between the bearing surface of the rack and the wall surface of the housing is prevented when said piston moves between said positions thereof;
   said pinion having a locking lug thereon; and
   locking means engageable with said locking lug to lock the pinion against rotation when said piston is in one of said positions thereof.
2. A combination as defined in claim 1 including a differentially splined shaft drivingly connected to said pinion and driven thereby.
3. A combination as defined in claim 2 wherein said locking means is within said housing.
4. A combination as defined in claim 1 wherein said pinion has a first peripheral portion with teeth thereon and said locking means includes a second peripheral portion of the pinion which is in the form of a thin web terminating in a locking lug and a movable locking member engageable with the lug to lock the pinion against rotation when the piston is in said one position.

5. An actuator for actuating a movable member of a device wherein the device has a splined input shaft drivingly connected to the movable member for driving the movable member between first and second positions, said actuator comprising:
   a housing defining a chamber;
   a fluid pressure responsive piston slidable in said chamber between first and second positions corresponding to the first and second position of the movable member, said piston being movable in response to fluid pressure within the chamber;
   a rotatably mounted output shaft having splines thereon;
   means for drivingly connecting the output shaft and the piston to rotate said output shaft in response to movement of said piston between said positions thereof; and
   a differentially splined shaft drivingly engageable with the output shaft and the input shaft for drivingly connecting the piston and the movable member.

6. An actuator as defined in claim 5 including mechanical locking means within said housing for locking said piston in one of said positions thereof whereby the movable member can be held in one position thereof regardless of the fluid pressure within said chamber.

7. An actuator as defined in claim 5 wherein said means for drivingly connecting includes a rack fixed to said piston and movable therewith and a pinion connected to said output shaft and drivingly engaging said rack, said rack and said pinion being mounted within said housing.

8. An actuator for actuating the flaps of an airplane wherein the airplane has a splined input shaft drivingly connected to the flaps of the airplane for driving the flaps between the first and second positions and a stop for holding said flaps in said first position thereof and wherein the actuator includes a housing, power means within the housing drivingly connected to a splined output shaft rotatable between first and second positions thereof corresponding to the first and second positions of the flaps and locking means for holding said output shaft in said first position thereof, said actuator being connectible to the airplane with the housing being in a predetermined orientation relative to the airplane, the improvement to permit drivingly connecting the output shaft and the input shaft with said shafts being held in said first positions thereof and with the housing being in said predetermined orientation, comprising:
   a shaft having a first number of splines on a first portion thereof and a second number of splines on a second portion thereof with said first and second portions of said shaft being drivingly engageable with said output shaft and said input shaft, respectively, one of said number of splines being greater than the other of said number of splines.

9. An improvement as defined in claim 8 wherein said second number of splines is greated than said first number of splines.

10. An improvement as defined in claim 8 wherein there are 33 splines on said first portion of said shaft and there are 34 teeth on said second portion of said shaft.

References Cited

UNITED STATES PATENTS

| 2,681,581 | 6/1954 | Pearson | 92—136 X |
| 3,246,581 | 4/1966 | Carr | 92—136 |
| 3,338,140 | 8/1967 | Sheesley | 92—136 X |

LEONARD H. GERIN, Primary Examiner

U.S. Cl. X.R.

74—422; 92—136; 287—53